(12) United States Patent
Lee et al.

(10) Patent No.: US 6,320,450 B1
(45) Date of Patent: *Nov. 20, 2001

(54) TEMPERATURE SENSING CIRCUIT USING THERMOPILE SENSOR

(75) Inventors: Koon Seok Lee; Jeong Hyun Lim, both of Kyongsangnam-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/429,930

(22) Filed: Oct. 29, 1999

(30) Foreign Application Priority Data

Oct. 31, 1998 (KR) .................................................. 98-46607

(51) Int. Cl.[7] .............................. H03K 17/78; G01J 5/14
(52) U.S. Cl. ......................................... 327/513; 374/149
(58) Field of Search .................................. 327/512, 513, 327/561, 563; 374/120, 121, 122, 126, 128, 133, 149

(56) References Cited

U.S. PATENT DOCUMENTS

| | | | |
|---|---|---|---|
| 4,734,554 | * 3/1988 | Tateda et al. | 219/10.55 B |
| 5,304,950 | 4/1994 | Martin et al. | 330/308 |
| 5,826,982 | * 10/1998 | Schieferdecker et al. | 374/149 |
| 5,876,120 | * 3/1999 | Lee | 374/149 |
| 6,048,092 | * 4/2000 | Kimura et al. | 374/129 |

* cited by examiner

Primary Examiner—My-Trang Nuton
(74) Attorney, Agent, or Firm—Fleshner & Kim, LLP (57) ABSTRACT

A temperature sensing circuit using a thermopile sensor is provided which includes a thermopile sensor generating a voltage corresponding to an incidence amount of infrared rays, means for amplifying the output of the thermopile sensor, means for compensating for an offset of the amplifying means, and means for removing the output of the offset compensating means from the output of the amplifying means, to detect the temperature of an object.

25 Claims, 7 Drawing Sheets

$$\begin{bmatrix} 1/Rth & 1/R4 & -(1/Rth+1/R4+1/R5) \\ 1/R1+1/R2+1/Rth & -1/R2 & -1/Rth \\ 1/R2 & -(1/R2+1/R3+1/R4) & 1/R4 \end{bmatrix} \begin{bmatrix} Vth \\ V1 \\ V2 \end{bmatrix} = \begin{bmatrix} -Vcc/R6 \\ Vcc/R1 \\ 0 \end{bmatrix}$$

TEMPERATURE SENSING CIRCUIT USING THERMOPILE SENSOR

BACKGROUND OF THE INVENTION

1. Field of the Invention

The present invention relates to a temperature sensing circuit using a thermopile sensor and, more particularly, to a temperature sensing circuit using a thermopile sensor, which is able to detect temperature accurately with regard to an offset of an amplifier included therein.

2. Discussion of Related Art

In general, a thermopile sensor is a device which generates a voltage corresponding to the difference between a temperature of infrared rays incident from an object and a surrounding temperature of the sensor. This thermopile sensor is usually employed as a device for sensing the temperature of a food placed in the cooking room of a mircrowave oven. However, a signal detected by the thermopile sensor is too weak to be directly used for controlling cooking in the microwave oven. Accordingly, the signal is needed to be amplified to an appropriate level.

Figure 1:
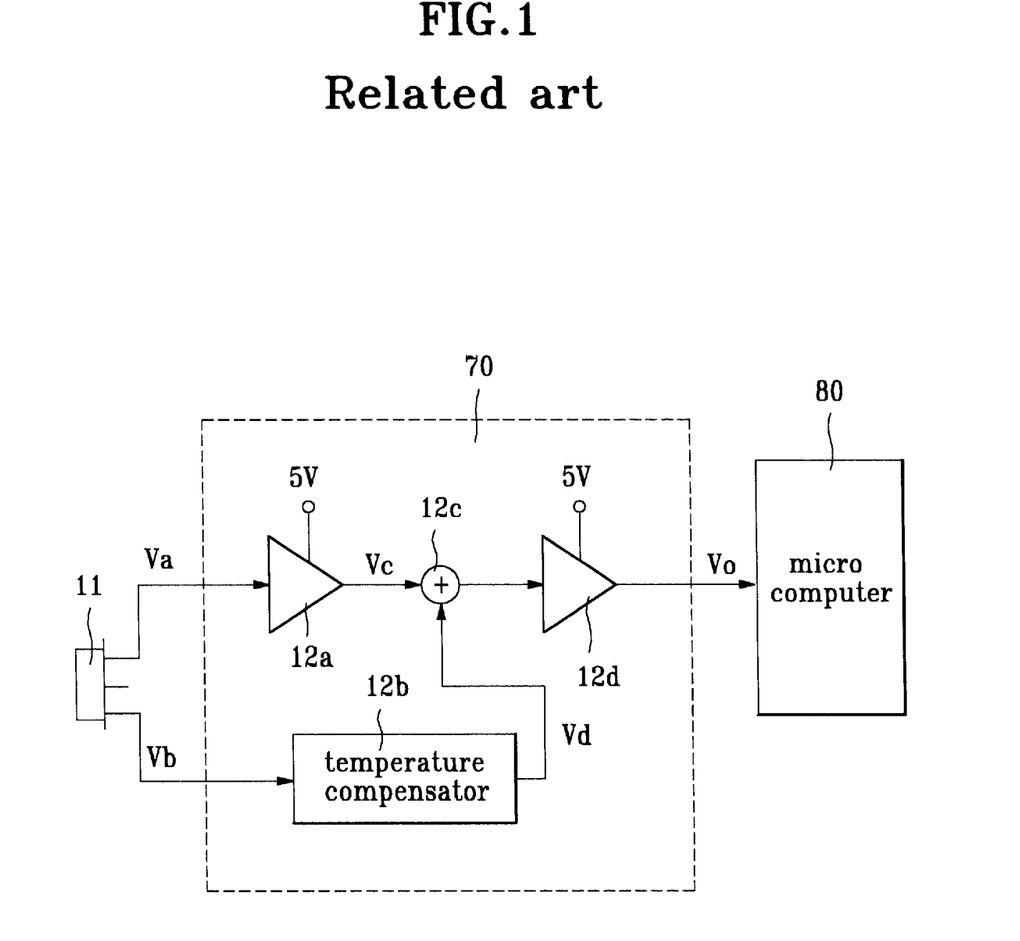
FIG. 1 shows the configuration of a conventional temperature sensing circuit.

A conventional temperature sensing circuit is explained below with reference to the attached drawing. FIG. 1 shows the configuration of a conventional temperature sensing circuit. Referring to FIG. 1, the conventional temperature sensing circuit is composed of a temperature detecting circuit 70 including a thermopile sensor 11 which generates a voltage value (Vb) corresponding to the difference between a temperature of infrared rays incident from an object and a surrounding temperature of the sensor, and a temperature amplifier 12 for compensating for an increase or decrease in voltage Vd with relation to the surrounding temperature within the output voltage of thermopile sensor 11.

Temperature amplifier 12 is composed of an amplifier 12a for amplifying the output of thermopile sensor 11, a temperature compensator 12b for amplifying output voltage Vb of thermopile sensor 11 and generating compensated voltage Vd, an adder 12c for adding an output of amplifier 12a to the voltage compensated by temperature compensator 12b, and an amplifier 12d for amplifying the output of adder 12c to generate a temperature sensing voltage Vo.

The operation of the conventional temperature sensing circuit is described below. Thermopile sensor 11 generates a voltage Va corresponding to the temperature of infrared rays incident from the object. Output voltage Va of thermopile sensor 11 varies with its surrounding temperature. The surrounding temperature is compensated using a temperature compensating device such as diode or thermistor which is arranged on one side of thermopile 11 or around it. The output value of the temperature compensating device corresponds to a resistance value when the temperature compensating device is a thermistor, and it corresponds to a voltage value when the device is a diode.

FIG. 1 shows a case where a diode is used as the temperature compensating device. Thermopile sensor 11 generates voltage Va corresponding to the temperature of infrared rays incident from the object. Amplifier 12a amplifies the output of thermopile sensor 11, and temperature compensator 12b amplifies output voltage Vb of the temperature compensating device (not shown). Adders 12c adds output voltage Vc of amplifier 12a to output voltage Vd of temperature compensator 12b. Here, the output of adder 12c becomes a voltage corresponding to the temperature of the object, which is obtained by removing the effect of the surrounding temperature of thermopile from output voltage Va of thermopile sensor 11. Amplifier 12d connected to the output terminal of adder 12c amplifies the output voltage of adder 12c and sends resulting value Vo to a microcomputer 80. Microcomputer 80 detects the temperature of the object according to output voltage Vo of temperature amplifier 12.

The aforementioned conventional temperature sensing circuit has the following problems. First of all, it requires the amplifier for amplifying the output of the thermopile sensor and the plurality of amplifiers for compensating for the variation in the surrounding temperature, resulting in complicated circuit configuration. Furthermore, the temperature compensating device and amplifiers are added, increasing the cost. Moreover, the output voltage of the thermopile sensor is amplified together with the offset values of the amplifiers so that it cannot be correctly calculated, deteriorating accuracy in temperature detection.

SUMMARY OF THE INVENTION

Accordingly, the present invention is directed to a temperature sensing circuit using a thermopile sensor that substantially obviates one or more of the problems due to limitations and disadvantages of the related art.

An object of the present invention is to provide a temperature sensing circuit using a thermopile sensor, which removes an error of an amplifier to accurately detect the temperature of an object.

To accomplish the object of the present invention, there is provided a temperature sensing circuit using a thermopile sensor, which includes a thermopile sensor generating a voltage corresponding to an incidence amount of infrared rays, means for amplifying the output of the thermopile sensor, means for compensating for an offset of the amplifying means, and means for removing the output of the offset compensating means from the output of the amplifying means, to detect the temperature of an object.

According to a preferred embodiment of the present invention, the offset compensating means is configured of a combination of resistors which is determined according to the offset value of the amplifying means. The amplifying means uses a voltage varying with a surrounding temperature as a reference voltage.

There is also provided a temperature sensing circuit using a thermopile sensor which includes a thermopile sensor generating a voltage corresponding to an incidence amount of infrared rays, surrounding temperature compensating means being placed adjacent to the thermopile sensor, for generating a compensation voltage for removing the effect of surrounding temperature, means for amplifying the output of the thermopile sensor using the compensation voltage generated by the surrounding temperature compensating means as a reference voltage, and offset compensating means for controlling the reference voltage of the amplifying means according to an offset of the amplifying means.

The offset compensating means is configured in such a manner that a resistor with a resistance value proportional to the offset of the amplifying means is connected between the reference voltage terminal of the amplifying means and a power supply terminal when the offset of the amplifying means has a negative value. The offset compensating means is configured in such a manner that a resistor with a resistance value proportional to the offset of the amplifying means is connected between the reference voltage terminal of the amplifying means and a ground terminal when the offset of the amplifying means has a positive value.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENT

Reference will now be made in detail to the preferred embodiments of the present invention, examples of which are illustrated in the accompanying drawings.

Figure 2:
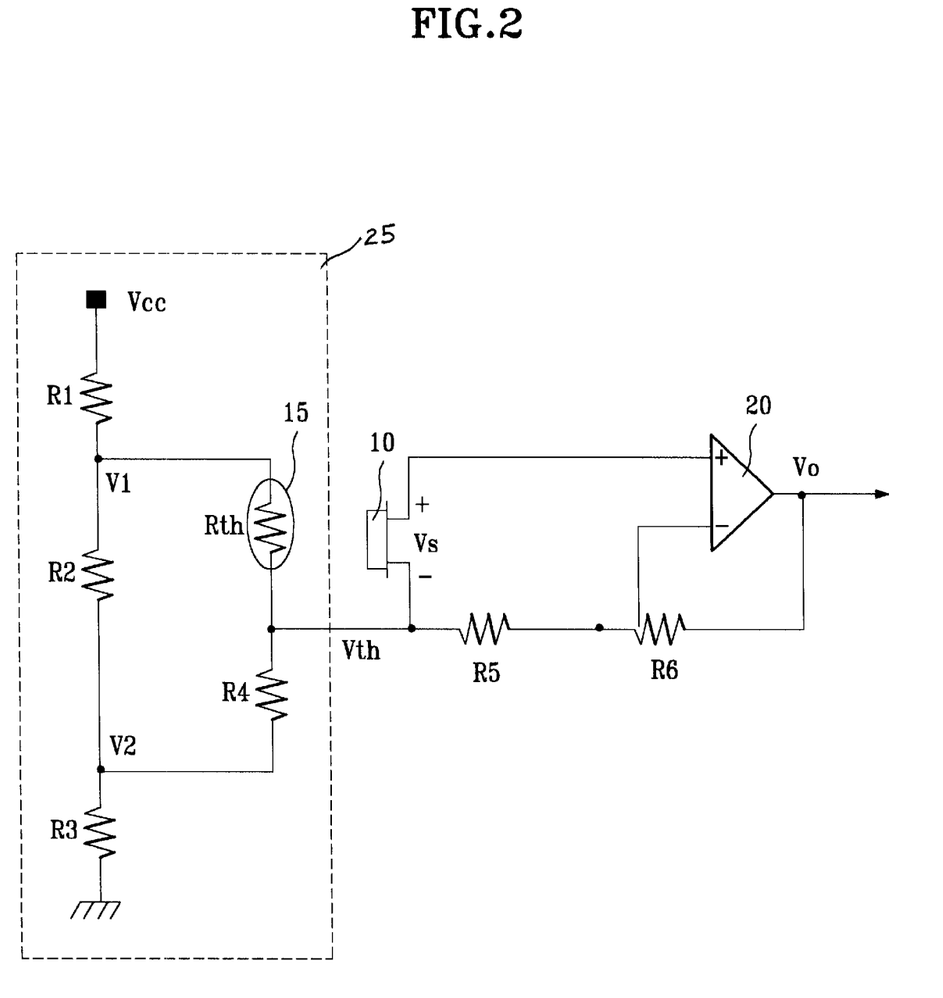
FIG. 2 shows the configuration of a temperature sensing circuit using a thermopile sensor according to a first embodiment of the present invention.

FIG. 2 shows the configuration of a temperature sensing circuit using a thermopile sensor according to a first embodiment of the present invention. Referring to FIG. 2, the temperature sensing circuit using a thermopile sensor is composed of a thermopile sensor 10 generating a voltage corresponding to an incidence amount of infrared rays, an amplifying means 20 for amplifying an output voltage of thermopile sensor 10, and a surrounding temperature compensating means 25 for generating a compensation voltage Vth for removing the effect of a surrounding temperature using a temperature compensating device (for example, a thermistor 15) place adjacent to thermopile sensor 10 and applying compensation voltage Vth to the input terminal of amplifying means 20 as a reference voltage.

Surrounding temperature compensating means 25 is composed of a plurality of resistors and the temperature compensating device. Specifically, it consists of resistors R1, R2 and R3 serially connected between power supply terminal Vcc and ground terminal GND, thermistor 15 connected parallel to resistor R2 between a node V1 placed between resistors R1 and R2 and anode V2 placed between resistors R2 and R3, and a resistor R4. Surrounding temperature compensating means 25 minimizes the effect of a variation in a temperature surrounding thermopile sensor 10, minimizing an error in temperature detection by thermopile sensor 10. That is, surrounding temperature compensating means 25 generates reference voltage Vth which varies with the surrounding temperature using thermistor 15 and resistors R1 to R4 and applies it to amplifying means 20 as a reference voltage. Then, amplifying means 20 amplifies an output voltage Vs of thermopile sensor 10 on the basis of reference voltage Vth and outputs it. Output voltage Vs of thermopile sensor 10 is applied to the non-inverted input terminal of amplifying means 20 and reference voltage Vth is applied to its inverted input terminal through resistor R5. An output voltage Vo of amplifying means 20 is determined according to the following expression (1).

$$Vo=Vs\times(1+R6/R5)+Vth \quad (1)$$

Where, Vs is the output voltage of the thermopile sensor, (1+R6/R5) is the amplification ratio of the amplifying means, and Vth is the compensation voltage (reference voltage) corresponding to the variation in the surrounding temperature. Accordingly, amplifying means 20 outputs the value obtained by multiplying output Vs of thermopile sensor 10 by the amplification ratio on the basis of reference voltage Vth corresponding to the surrounding temperature.

According to the first embodiment of the present invention, since the temperature sensing circuit is composed of one amplifier, thermopile sensor and surrounding temperature compensating means including the temperature compensating device and resistors, the number of amplifier is reduced compared to the conventional temperature sensing circuit. This simplifies the circuit configuration and decreases the cost, strengthening price competitiveness. However, the offset of the amplifier is not regarded in the first embodiment of the present invention. This results in difficulty in accurate temperature detection. That is, when thermopile sensor 10 senses the temperature of an object identical to the surrounding temperature, output value Vs of thermopile sensor 10 becomes "0".

When output value Vs of thermopile sensor 10 is applied to the expression (1), output voltage Vo of amplifying means 20 becomes Vo=0x(1+R6/R5)+Vth. Accordingly, ideal output voltage Vo of amplifier 20 must be Vth. However, the actual output voltage value of amplifier 20 is not equal to Vth because the amplifier has an offset. When the temperature of an object, equal to the surrounding temperature, is sensed, for example, on condition that the amplification ratio of amplifier 20 is 4000, offset voltage is 5 µV, and reference voltage Vth is 1.6 V, output voltage Vo of amplifying means 20 should be 1.6 V theoretically. However, there is increase of 200 mV (=4000×50 µV) in the output voltage due to the offset of amplified 20. Thus, the actual output voltage of the amplifier becomes 1.62 V. This means that, when the temperature of an object is sensed using the thermopile sensor, the current offset and voltage offset of the amplifier are very important factors. When the amplification ratio is set to 4000 as described above, the error due to the offset of the amplifier is 25% approximately compared to the output of the thermopile sensor. Accordingly, a circuit design with regard to the offset of the amplifier is required in order to accurately sense the temperature.

Figure 3:
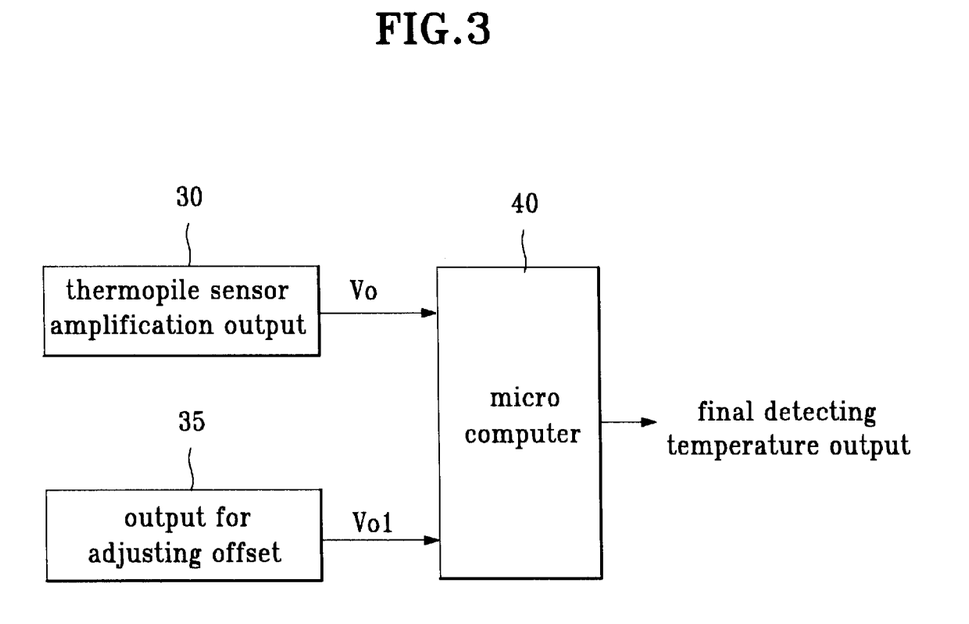
FIG. 3 shows the configuration of a temperature sensing circuit using a thermopile sensor according to a second embodiment of the present invention.

FIG. 3 is a block diagram of a temperature sensing circuit using a thermopile sensor according to the second embodiment of the present invention. The second embodiment of the present invention allows accurate temperature detection with regard to the offset of the amplifier. Referring to FIG. 3, the temperature sensing circuit includes a first circuit 30 for amplifying a signal detected by a thermopile sensor, a second circuit 35 for generating a signal for controlling the offset of an amplifying means included in first circuit 30, and a microcomputer 40 for operating the outputs of first and second circuits 30 and 35 to detect a voltage corresponding to the difference between the temperature of an object and surrounding temperature of the thermopile sensor.

The temperature sensing circuit according to the second embodiment of the present invention amplifies output Vo of the thermopile sensor, which corresponds to the difference between the temperature of the object and surrounding temperature of the thermopile sensor, and applies it to the first input of microcomputer 40. The temperature sensing circuit also applies output Vo1 for controlling the offset to the second input of microcomputer 40. Microcomputer 40 performs addition or subtraction of the two input signals, outputting a final detection temperature.

Figure 4:
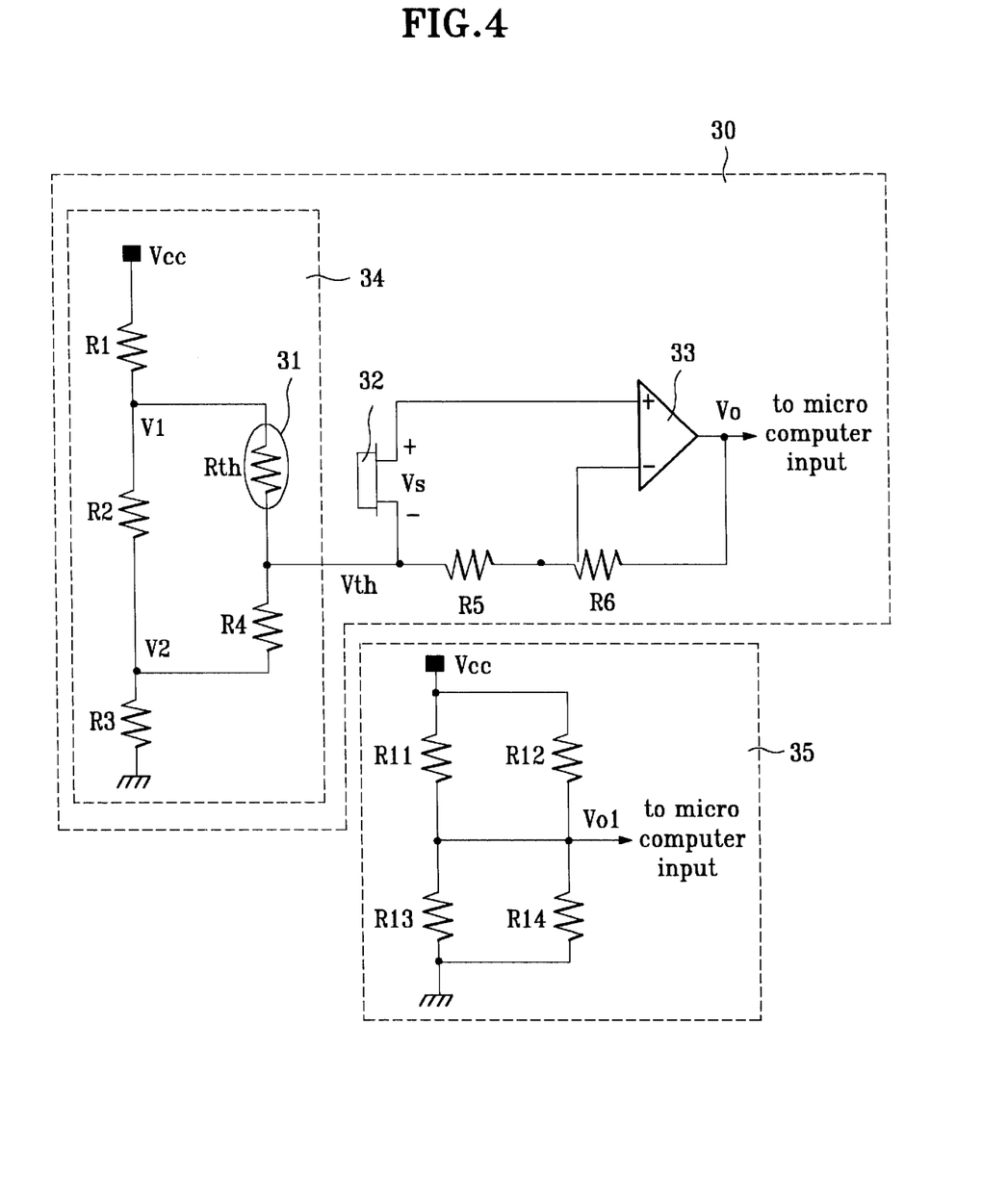
FIG. 4 is a circuit diagram showing portions of the temperature sensing circuit of FIG. 3.

FIG. 4 is a circuit diagram of portions of the circuit of FIG. 3. Referring to FIG. 4, first circuit 30 is composed of a thermopile sensor 32, an amplifying means 33 and a surrounding temperature compensating means 34. The positive terminal of thermopile sensor 32 is connected to the non-inverted input terminal of amplifying means 33, and its negative terminal is connected to a reference voltage (Vth) terminal being joined to the inverted input terminal of amplifying means 33. Reference voltage Vth of amplifying means 33 is determined as a compensation voltage according to surrounding temperature compensating means 34. That is, reference voltage Vth is determined by surrounding temperature compensating means 34 being composed of resistors and a thermistor.

As shown in FIG. 4, surrounding temperature compensating means 34 is constructed in such a manner that resistors R1, R2 and R3 are serially connected between power supply terminal Vcc and ground terminal GND, and a thermistor 31 and resistor R4 are serially connected between a node V1 placed between resistors R1 and R2 and a node V2 placed between resistors R2 and R3. Reference voltage Vth corresponding to a variation in the temperature surrounding thermopile sensor 32 is determined by thermistor 31 and resistors R1, R2, R3 and R4, and determined reference voltage Vth is applied to inverted input terminal of amplifying means 33 through resistor R5. The output terminal of amplifying means 33 is connected to the inverted input terminal of amplifying means 33 through resistor R6. Output Vo of amplifying means 33 is applied to the first input of microcomputer 40.

The operation of first circuit 30 constructed as above is explained below. Thermopile sensor 32 generates a voltage Vs which corresponds to the difference between a temperature of infrared rays incident from an object and surrounding temperature of thermopile sensor 32. Output Vs of thermopile sensor 32 is applied to the non-inverted input terminal of amplifying means 33. Amplifying means 33 employs the voltage determined by thermistor 31 and resistors R1, R2, R3 and R4 as reference voltage Vth. Reference voltage Vth is determined by thermistor 31 having a resistance value which varies with its surrounding temperature and resistors R1, R2 and R3. This means that the reference voltage varies with the surrounding temperature.

Reference voltage Vth varying with the surrounding temperature is applied to the inverted input terminal of amplifier 33. Amplifier 33 amplifies output voltage Vs of thermopile sensor 32 by amplification ratio (1+R6/R5) on the basis of reference voltage Vth. In other words, actual output Vo of amplifier 33 is not determined by a value obtained by the expression (1) because current and voltage offsets ($\alpha$) are reflected when amplification is performed in amplifier 33. That is, the actual output signal of amplifier 33 becomes the sum of a value Vo' determined by the expression (1) and offset ($\alpha$). This output signal (Vo'+$\alpha$) of amplifier 33 is applied to the first input terminal of microcomputer 40.

Second circuit 35 which generates the signal for controlling the offset is composed of a plurality of resistors connected between power supply terminal Vcc and ground terminal GND. These resistors are not fixed but variably configured according to offset value ($\alpha$) of amplifier 33. For instance, the offset value of amplifier 33 is determined by a voltage according to a resistor R11, second circuit 35 is configured to generate a voltage signal for controlling the offset using only resistor R11. When the temperature sensing circuit needs an offset controlling voltage as much as a voltage Vo1 determined by four resistors R11, R12, R13 and R14, second circuit 35 will be configured of the resistors as shown in FIG. 4.

An offset controlling output signal of second circuit 35 is determined as below. First of all, when thermopile sensor 32 detects the temperature of an object, which is equal to its surrounding temperature, voltage Vs across both terminals of thermopile sensor 32 is "0". When this value "0" is applied to the expression (1), output voltage Vo of amplifier 33 becomes Vo=0×(1+R6/R5)+Vth. Accordingly, output voltage vo of ideal amplifier 33 is determined only be reference voltage Vth. However, output voltage Vo of amplifier 33 also includes offset voltage ($\alpha$) in addition to reference voltage Vth. Reference voltage Vth is subtracted from output voltage Vo of amplifier 33 to calculate its offset voltage ($\alpha$). Then, output voltage Vo1 of second circuit 35 is determined with regard to offset voltage ($\alpha$). For example, with four resistors R11, R12 R13 and R14 being prepared as shown in FIG. 4, an appropriate offset value is divided into fifteen grades according to voltages determined by various combinations of resistors as shown in Table 1.

TABLE 1

| R11 | R12 | R13 | R14 | R11, R12 | R11, R13 | R11, R14 | R12, R13 | R12, R14 | R13, R14 |
|---|---|---|---|---|---|---|---|---|---|
| A | B | C | D | E | F | G | H | I | J |
| R11, R12, R13 | | R11, R12, R14 | | R11, R13, R14 | | R12, R13, R14 | | R11, R12, R13, R14 | |
| K | | L | | M | | N | | O | |

Among these combinations, a group of resistors corresponding to an offset value that is the closest to the offset value ($\alpha$) of amplifier (33) included in first circuit 30 is selected to construct second circuit 35. Accordingly, second circuit 35 outputs an uniform offset control signal all the time according to the selected group of resistors. Here, second circuit 35 must be configured of a group of resistors selected on basis of a predetermined offset value before the system is shipped. Second circuit 35 may be composed of only resistor R11 or four resistors R11, R12, R13 and R14 as shown in FIG. 4 according to the offset of amplifier 33. With a group of resistors being appropriately selected, second circuit 35 outputs A with only resistor R11, and outputs C with only resistor R13. Thus, second circuit 35 outputs various offset values of different grades. Theses output values of different grades should have a difference among them so that microcomputer 40 can recognize each value. For example, A has a voltage similar to power supply voltage Vcc, B corresponds to ground voltage GND and E corresponds to (R11×Vcc)/(R11+R13) so as to allow microcomputer 40 to be able to detect each one. Microcomputer 40 operates the amplified signal output from first circuit 30 and the offset control signal output from second circuit 35 to determine the final temperature.

As an example, when the offset voltage of amplifier 33 is 100 mV, second circuit 35 is configured of a group of resistors which is able to generate a voltage value that is the closest to 100 mV. Then, when the temperature of an object is detected, the output of second circuit 35 is subtracted from the output of first circuit 30 to judge the temperature of the object. By doing so, very accurate temperature detection can be performed with regard to the offset of amplifier 33. Furthermore, in realization of the second circuit generating the offset control signal, the minuter offset value is divided using a lot of combinations of resistors, the more accurate temperature detection is made.

Figure 5:
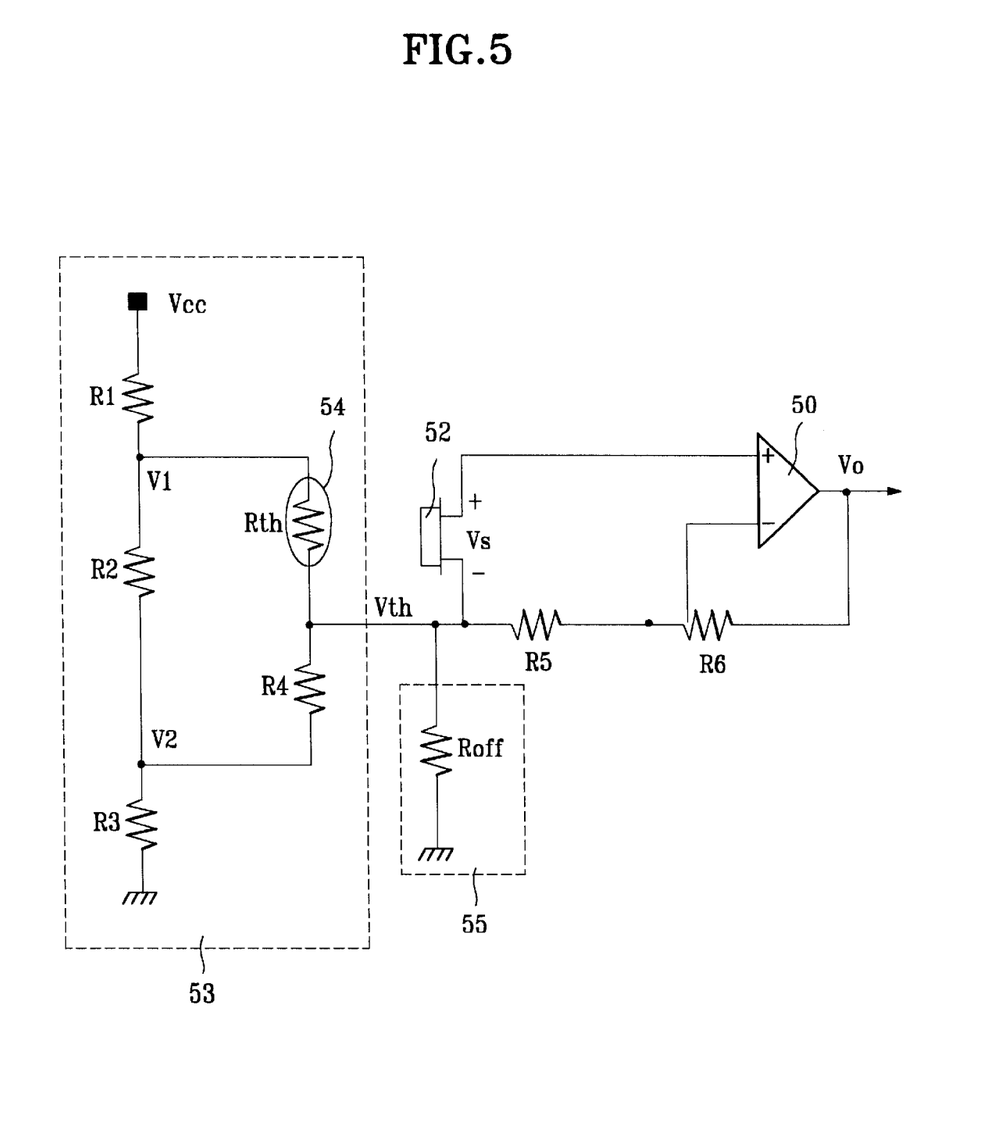
FIG. 5 shows the configuration of a temperature sensing circuit according to a third embodiment of the present invention.

FIG. 5 shows the configuration of a temperature sensing circuit according to the third embodiment of the present invention. In this embodiment, an offset resistor Roff to which the offset of an amplifying means 50 is directly applied is connected between reference voltage terminal Vth and ground terminal GND. Referring to FIG. 5, the temperature sensing circuit is composed of amplifying means 50, a thermopile sensor 52, a surrounding temperature compensating means 53 and an offset compensating means 55.

Offset compensating means 55 which is arranged between reference voltage terminal Vth and ground terminal GND reduces reference voltage Vth determined by surrounding temperature compensator 55 according to an offset resistance value. Offset compensating means 55 is configured of resistor Roff with a resistance value corresponding to the offset resistance value of amplifying means 50. Accordingly, it controls reference voltage Vth of amplifying means 50 when there is an offset of amplifying means 50, vary the final output. That is, output Vo of amplifying means 50 is determined according to $Vo = Vsx(1 + R6/R5) + Vth$. Here, reference voltage Vth is set lower than a predetermined level because it includes the offset resistance of amplifying means 50. Consequently, the offset of amplifying means 50 is increased or decreased to result in accurate temperature detection.

Figure 7:
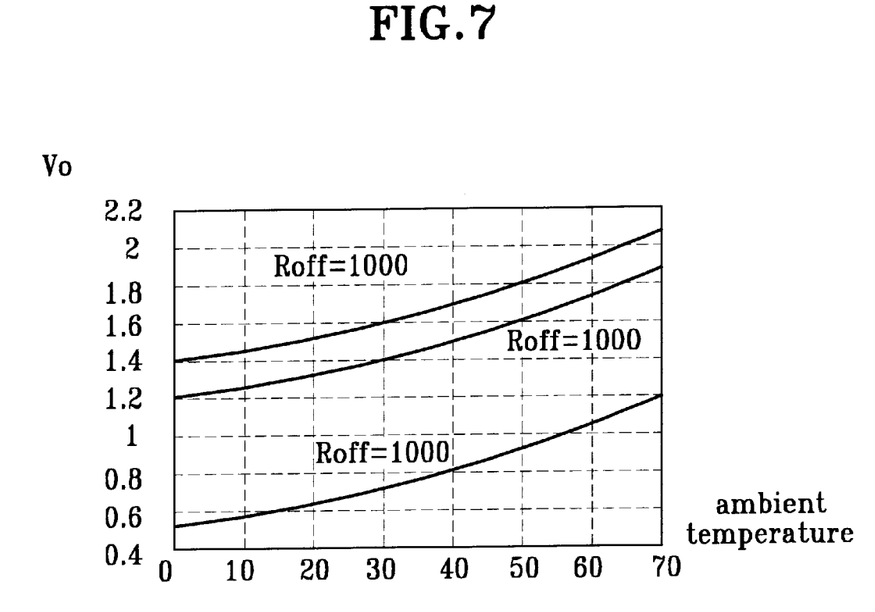
FIG. 7 is a graph showing an output voltage of an amplifier when its offset resistance value is varied.

FIG. 7 shows output voltage Vo of amplifying means 50 when its offset resistance value is varied. The temperature slopes shown in FIG. 7 are maintained even when offset resistance value Roff is changed. The expression shown under FIG. 7 represents the relation between voltages and reference voltage Vth. The graph of FIG. 7 is obtained on the basis of this expression.

The reference voltage becomes lower than the predetermined level as the offset resistance decrease. Thus, if the offset of amplifying means 50 is positively large, an offset resistance proportional thereto is added to lower the reference voltage by the offset resistance value. Accordingly, the circuit design with regard to the offset of amplifying means 50 can be realized. Furthermore, when the reference voltage is required to be controlled upward or downward on the basis of the offset of the amplifying means, it is previously adjusted by setting an arbitrary resistance and than an appropriate resistance proportional to the arbitrary resistance is selected. This enables the temperature sensing circuit to prepare for positive and negative offset controls.

Figure 6:
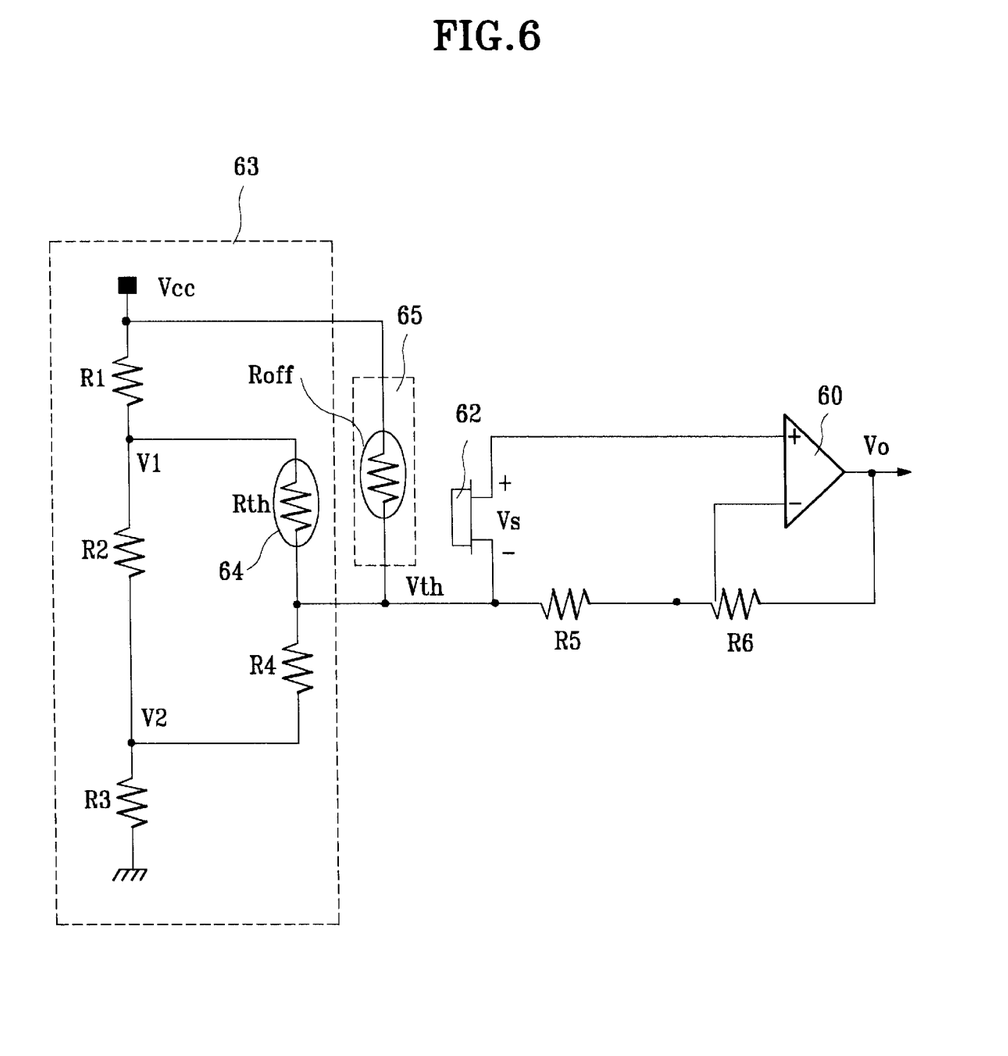
FIG. 6 shows the configuration of a temperature sensing circuit according to a fourth embodiment of the present invention.

FIG. 6 shows the configuration of a temperature sensing circuit according to the fourth embodiment of the present invention, in which an offset resistor Roff to which the offset of an amplifier 60 is applied is connected between reference voltage terminal Vth and power supply terminal Vcc. Referring to FIG. 6, the temperature sensing circuit is composed of amplifying means 60, a thermopile sensor 62, a surrounding temperature compensating means 63 and an offset compensating means 65 connected between reference voltage terminal Vth and power supply terminal Vcc.

Offset compensating means 65 is configured of a resistor Roff with a resistance value corresponding to the offset resistance value of amplifying means 60. Addition of offset resistor Roff between power supply terminal Vcc and reference voltage terminal Vth increases the reference voltage corresponding to the offset resistance value. Specifically, the parallel resistance between offset controlling resistor Roff, a thermistor 64 and s resistor R1 is reduced, to thereby increase reference voltage Vth. However, the slope of thermistor compensation curve according to the surrounding temperature is maintained without any change.

Therefore, when the offset of amplifying means 60 is negatively large, the offset resistor is selectively added between power supply terminal Vcc and reference voltage Vth, as shown in FIG. 6, to allow reference voltage Vth to include a value corresponding to the offset of amplifying means 60. In other words, the circuit can be designed with regard to the offset of amplifying means 60. If the offset of the amplifying means is high, the offset resistor is added between reference voltage Vth and ground terminal GND, as shown in FIG. 5, to set the reference voltage lower than a predetermined level.

Moreover, according to another embodiment of the present invention, the offset of the amplifying means can be controlled by adding the offset resistors of FIGS. 5 and 6 simultaneously. Specifically, a first offset compensating resistor is connected between reference voltage terminal Vth and power supply terminal Vcc and a second offset compensating resistor is connected between reference voltage termnal Vth and ground terminal GND so that the reference voltage can be adjusted through the first offset compensating resistor when the offset value of the amplifying means is negatively large, and it can be adjusted through the second offset compensating resistor when the offset of the amplifying means is positively large.

As described above, the temperature sensing circuit of the present invention, when it senses the temperature of an object using the thermopile sensor, accurately detects the output of the thermopile sensor without distortion by compensating for detection error due to the offset value.

It will be apparent to those skilled in the art that various modifications and variations can be made in the temperature sensing circuit using a thermopile sensor of the present invention without departing from the spirit or scope of the invention. Thus, it is intended that the present invention cover the modifications and variations of this invention provided they come within the scope of the appended claims and their equivalents.

What is claimed is:

1. A temperature sensing circuit using a thermopile sensor, comprising:
   a thermopile sensor generating a voltage corresponding to an incidence amount of infrared rays;
   means for amplifying the output of the thermopile sensor;
   means for compensating for an offset value of the amplifying means; and
   a micro-computer for adjusting the output of the amplifying means based on the offset value, to detect the temperature of an object.

2. The temperature sensing circuit as claimed in claim 1, wherein the offset compensating means is configured of a combination of resistors which is determined according to the offset value of the amplifying means.

3. The temperature sensing circuit as claimed in claim 2, wherein the offset compensating means outputs a voltage value corresponding to the offset value.

4. The temperature sensing circuit as claimed in claim 1, wherein the amplifying means uses a voltage varying with a surrounding temperature as a reference voltage.

5. A temperature sensing circuit using a thermopile sensor, comprising:

a thermopile sensor generating a voltage corresponding to an incidence amount of infrared rays;

surrounding temperature compensating means being placed adjacent to the thermopile sensor, for generating a compensation voltage for removing the effect of surrounding temperature;

means for amplifying the output of the thermopile sensor using the compensation voltage generated by the surrounding temperature compensating means as a reference voltage; and offset compensating means for controlling the reference voltage of the amplifying means according to an offset of the amplifying means.

6. The temperature sensing circuit as claimed in claim 5, wherein the offset compensating means is configured in such a manner that a resistor with a resistance value proportional to the offset of the amplifying means is connected between the reference voltage terminal of the amplifying means and a power supply terminal when the offset of the amplifying means has a negative value.

7. The temperature sensing circuit as claimed in claim 5, wherein the offset compensating means is configured in such a manner that a resistor with a resistance value proportional to the offset of the amplifying means is connected between the reference voltage terminal of the amplifying means and a ground terminal when the offset of the amplifying means has a positive value.

8. The temperature sensing circuit as claimed in claim 5, wherein the surrounding temperature compensating means is composed of a plurality of resistors which are serially connected between the power supply terminal and ground terminal, and a temperature compensating device which is connected between the power supply terminal and ground terminal in parallel with the resistors.

9. The temperature sensing circuit as claimed in claim 8, wherein the temperature compensating device is a thermistor.

10. The temperature sensing circuit as claimed in claim 8, wherein the surrounding temperature compensating means further comprises a resistor serially connected to the temperature compensating device.

11. A temperature sensing circuit using a thermopile sensor, comprising:

a thermopile sensor generating a first voltage corresponding to an incidence amount of infrared rays;

surrounding temperature compensating means for generating a second voltage corresponding to a variation in the surrounding temperature of the thermopile sensor;

amplifying means for amplifying the first voltage using the second voltage as a reference voltage; and offset compensating means being composed of a first offset compensator, connected between a power supply terminal and reference voltage terminal, for compensating for an offset of the amplifying means and a second offset compensator, connected between the reference voltage terminal and a ground terminal, for compensating for the offset of the amplifying means, the offset compensating means controlling the second voltage selectively using the first or second offset compensator according to a level of the offset of the amplifying means.

12. The temperature sensing circuit as claimed in claim 11, wherein the first offset compensator includes a resistor with a resistance value corresponding to the offset of the amplifying means when the offset of the amplifying means has a negative value.

13. The temperature sensing circuit as claimed in claim 11, wherein the second offset compensator includes a resistor with a resistance value corresponding to the offset of the amplifying means when the offset of the amplifying means has a positive value.

14. A temperature sensing circuit using a thermopile sensor, comprising:

a thermopile sensor generating a voltage corresponding to an incidence amount of infrared rays;

means for amplifying the output of the thermopile sensor, the amplifying means uses a first voltage varying with a surrounding temperature as a reference voltage;

means for generating a second voltage corresponding to an offset value of the amplifying means; and micro-computer detecting a temperature of an object by subtracting the second voltage from the first voltage.

15. The temperature sensing circuit of claim 14, wherein the means for generating the second voltage is a combination of resistors which is determined according to the offset value of the amplifying means.

16. A temperature sensing circuit comprising:

a sensor that generates a first signal indicative of a temperature of a target object;

a temperature compensator that outputs a second signal indicative of ambient temperature;

an amplifier having a prescribed offset value and having first and second inputs and an output, the first input coupled for receiving the first signal and the second input being coupled for receiving the second, said amplifier amplifying the first signal of the sensor using the second signal of the temperature compensator as a reference signal; and an offset circuit that compensates for the prescribed offset value of said amplifier.

17. The temperature sensing circuit of claim 16, further comprising a micro-computer, wherein said offset circuit outputs a third signal and said micro-computer adjusts the output of said amplifier based on the third signal such that the temperature of the target object is accurately determined.

18. The temperature sensing circuit of claim 17, wherein the offset circuit comprises a resistive circuit having a variable resistance which is configured based on the prescribed offset value.

19. The temperature sensing circuit of claim 18, wherein the resistive circuit comprises a first pair of variable resistors coupled in series and a second pair of variable resistors coupled in series, said first and second pair of variable resistors being coupled in parallel and the third signal being provided at a node connection of the first and second pairs of resistors.

20. The temperature sensing circuit of claim 17, wherein an output of the amplifier equals (Vs*(amplification ratio of amplifier)+Vth)+offset value), wherein Vs equals the first signal and Vth equals the second signal.

21. The temperature sensing circuit of claim of claim 16, wherein the offset circuit is coupled to the temperature compensator such that the second signal is adjusted for the offset value of said amplifier.

22. The temperature sensing circuit of claim 16, further comprising a first resistor and a second resistor coupled in series between the temperature compensator and the output of said amplifier, wherein a node connection between the first and second resistors is coupled to the second input of said amplifier.

23. The temperature sensing circuit of claim 21, wherein the offset circuit is a resistor.

24. The temperature sensing circuit of claim 16, wherein said sensor is a thermopile sensor.

25. The temperature sensing circuit of claim 16, wherein said temperature compensator comprises:

first, second and third transistors coupled in series;

a thermistor and a fourth transistor coupled in series, said thermistor being coupled to a serial connection between said first and second resistors and said fourth transistor being coupled to a serial connection between said second and third resistors, the second signal being provided at a node connection between said thermistor and said fourth transistor.

\* \* \* \* \*